(12) United States Patent
Lemaire

(10) Patent No.: US 11,320,195 B2
(45) Date of Patent: May 3, 2022

(54) DISTILLATION COLUMN CHAMBER

(71) Applicant: L'Air Liquide, Societe Anonyme pour l'Etude et l'Exploitation des Procedes Georges Claude, Paris (FR)

(72) Inventor: Franck Lemaire, Champigny sur Marne (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 91 days.

(21) Appl. No.: 16/584,143

(22) Filed: Sep. 26, 2019

(65) Prior Publication Data
US 2020/0103164 A1    Apr. 2, 2020

(30) Foreign Application Priority Data

Sep. 27, 2018  (FR) ...................................... 1858884

(51) Int. Cl.
*F25J 1/02*    (2006.01)
(52) U.S. Cl.
CPC .......... *F25J 1/0261* (2013.01); *F25J 2290/42* (2013.01)
(58) Field of Classification Search
CPC .......... F25J 3/04; F25J 3/04872; F25J 3/0489; F25J 3/04945; F25J 2290/30; F25J 2290/40; F17C 2203/03
See application file for complete search history.

(56) References Cited

U.S. PATENT DOCUMENTS

| | | | | | |
|---|---|---|---|---|---|
| 5,205,042 | A | * | 4/1993 | Greter | ...................... B01D 3/32 33/291 |
| 6,148,637 | A | * | 11/2000 | Guillard | ............... F25J 3/04466 62/643 |
| 7,516,626 | B2 | * | 4/2009 | Brox | .................... F25J 3/04951 62/643 |
| 2009/0211295 | A1 | * | 8/2009 | Cavagne | ................ F25J 3/0489 62/617 |
| 2009/0234346 | A1 | | 9/2009 | McBride, Jr. et al. | |
| 2015/0211681 | A1 | | 7/2015 | Conaughty et al. | |

FOREIGN PATENT DOCUMENTS

| | | |
|---|---|---|
| FR | 2 692 663 | 12/1993 |
| FR | 3 018 904 | 9/2015 |
| JP | H08 261644 | 10/1996 |

OTHER PUBLICATIONS

French Search Report and Written Opinion for FR 1 858 884, dated Apr. 15, 2019.
EP Search Report for EP 19 19 9000, dated Jan. 17, 2020.

* cited by examiner

*Primary Examiner* — Jianying C Atkisson
*Assistant Examiner* — Erik Mendoza-Wilkenfel
(74) *Attorney, Agent, or Firm* — Justin K. Murray

(57) ABSTRACT

A chamber for a distillation column that is to operate at a temperature below 0° C., comprises at least four walls, which in use are vertical, and a roof, the chamber being designed to contain at least one distillation column, at least one other element that is to operate at a cryogenic temperature, and insulation, at least one wall being convex.

16 Claims, 3 Drawing Sheets

DISTILLATION COLUMN CHAMBER

CROSS REFERENCE TO RELATED APPLICATIONS

This application claims the benefit of priority under 35 U.S.C. § 119 (a) and (h) to French patent application No. FR1858884, filed Sep. 27, 2018, the entire contents of which are incorporated herein by reference.

FIELD OF THE INVENTION

The present invention relates to a distillation column chamber and to a method for transporting a distillation column chamber.

BACKGROUND OF THE INVENTION

Distillation columns that need to operate at a temperature below ambient temperature are placed inside insulated chambers. These chambers, known as cold boxes, are generally of cuboid shape but may in some instances be of cylindrical shape, as illustrated in JP08261644 and FR3018904.

Other types of distillation columns may also be contained inside chambers for reasons of safety or of confidentiality.

SUMMARY OF THE INVENTION

Certain embodiments of the present invention seek to make it easier to transport such chambers.

Certain embodiments also seek to reduce the area occupied by a chamber, the amount of insulating material it contains, and therefore the cost of the unit. The curved shape of part of the chamber makes it possible to leave less space between the column and the wall of the chamber, by eliminating at least two corners, or even all of the corners, since the chamber has, in total, just two corners, or even none. The corner zone where two plates of the chamber are joined together is still a region where the risk of cracking is higher, with the possibility of the formation of ice, which is detrimental to the unit.

This new design combines the advantages of the two shapes that make up the chamber, the cylindrical part promoting structural strength and a reduction in the volume of the unit, including its footprint, and the cuboid part facilitating the installation of the pipework. In addition, the combination of the two shapes has the synergistic effect of eliminating at least some of the corners.

One subject of the invention provides a chamber for a distillation column that is to operate at a temperature below 0° C., or even at cryogenic temperature, comprising a distillation column that is to operate at a temperature below 0° C., insulation, at least four walls, which in use are vertical, having the same height in the vertical direction, possibly an element that is to operate at a temperature below 0° C. and a roof, characterized in that the at least four walls comprise at least two rectangular planar walls and at least one convex wall, an element closest to the convex wall that is to operate at a temperature of below 0° C. being cylindrical.

Preferably the cylindrical element closest to the convex wall that is to operate at a temperature of below 0° C. is a/the distillation column.

According to an alternative form, the chamber comprises two rectangular planar walls and two convex walls, defining a first space in the shape of a cuboid, with, on each side, a second space in the shape of a truncated cylinder.

According to another alternative form, the chamber comprises three rectangular planar walls surrounding a first space in the shape of a cuboid, and one convex wall surrounding a second space in the shape of a truncated cylinder.

According to other optional aspects, which can be combined with one another:
- the chamber comprises three rectangular planar walls surrounding a first space in the form of a cuboid, the three straight walls comprising a first planar wall connected to a free edge of the second planar wall by a right angle and connected to a free edge of the third planar wall by a right angle, and a convex wall, delimiting a second space consisting of a convex wall outside of the first space.
- the at least one convex wall has one edge which is an arc of a right circular or oval cylinder and the second space is potentially a half-cylinder.
- all the walls have the same height in the vertical direction.
- the chamber contains at least two stacked distillation columns and possibly a storage facility and/or a heat exchanger and/or pipes and/or a phase separator and/or another distillation column.
- the cylindrical element closest to the convex wall is a storage facility or a phase separator.
- the chamber contains just one column and possibly at least one storage facility
- the chamber contains several columns.
- at least one third of the volume of the cylindrical element is situated in the second space.
- only part of the volume of the cylindrical element is situated in the first space.
- the convex wall is an arc of a circle of diameter D and the cylindrical element has a cross section in the shape of a circle of diameter d, the centres of the circles being at least 1 m apart, the circles preferably being concentric.
- the ratio d/D' is between 0.6 and 0.95.
  - the cylindrical element closest to the convex wall has a diameter of at least 1 m, preferably at least 2 m or even at least 4 m
- the chamber contains insulation, for example being filled with powdered insulation.
- the chamber comprises a framework in the form of a cuboid containing pipes and acting as a support for the column and/or the pipes and/or a heat exchanger, the framework being contained wholly in the first space of the chamber.
- the convex wall is positioned facing into the prevailing wind.
- the distillation column is partially contained in the framework.
- the minimum separation between the column and the convex wall closest to the column and/or between the other element and the convex wall closest to the other element is between 400 mm and 1000 mm.
- the distillation column is cylindrical.
- more than one quarter, or even half, of the volume of the chamber is occupied by the column, which may be a single column or a double column made up of two stacked columns.
- less than one third, or even less than one quarter, of the volume of the chamber is occupied by the column, which may be a single column or a double column made up of two stacked columns.

the distillation column is completely surrounded with insulation.

the distillation column is wholly contained inside the chamber.

the height of the column is at least 10 m.

the height of the walls in the vertical direction is greater than the height of the column in the vertical direction.

Another aspect of the invention provides a separation unit, for example an air separation unit, separating air using cryogenic distillation and comprising a chamber as described hereinabove.

Another aspect of the invention provides a method for transporting part of a chamber of a distillation column as described hereinabove in which at least one convex wall is transported by a means of transport that may be a lorry or a boat, in which method at least one convex wall is placed on a flat surface of the means of transport, resting on the free edges of the convex wall.

Several convex walls each intended to form part of a chamber are potentially stacked on top of one another and transported by the means of transport.

BRIEF DESCRIPTION OF THE DRAWINGS

Further developments, advantages and possible applications of the invention can also be taken from the following description of the drawing and the exemplary embodiments. All features described and/or illustrated form the subject-matter of the invention per se or in any combination, independent of their inclusion in the claims or their back-references.

DETAILED DESCRIPTION OF THE INVENTION

The invention will be described in more detail with reference to the figures.

The figures show cross sections of a chamber for a distillation column, viewed from above.

Figure 1:
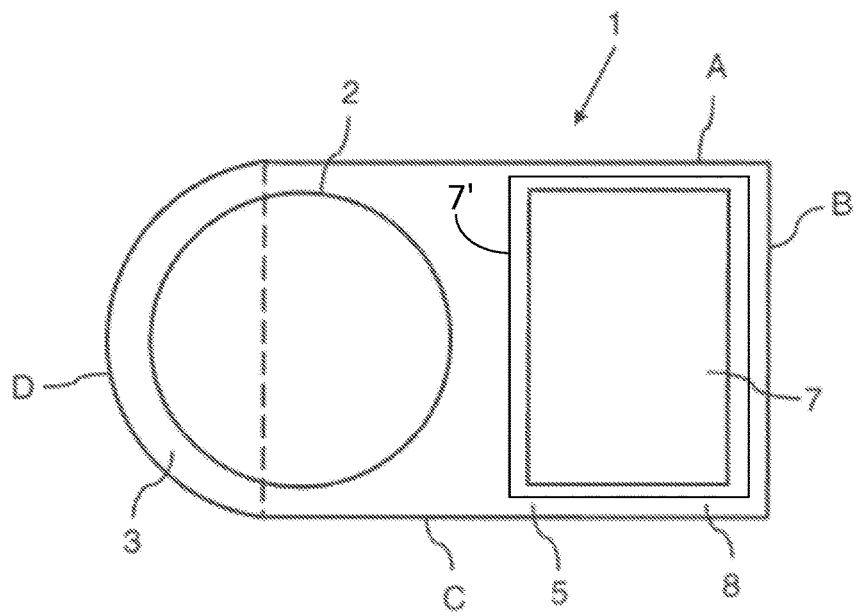
FIG. 1 provides a cross section view of a chamber in accordance with an embodiment of the present invention.

FIG. 1 shows a chamber 1 that is to contain at least two elements 2,7 that are to operate at a temperature below ambient temperature, or even at cryogenic temperature. That may be the chamber of an air separation unit, or of a unit for separating a mixture of hydrogen and of carbon monoxide, with possibly nitrogen or argon or methane, a mixture of methane and of nitrogen or a mixture of carbon dioxide, of oxygen and of nitrogen.

The distillation column 2 is a vertical cylinder that is to be used to separate a mixture as described. The element 2 may be two stacked distillation columns, for example the medium-pressure column and the low-pressure column of an air separation unit. In that case, the chamber is extremely tall, with a height exceeding 10 m, and potentially ranging from 15 to 60 m in height. At these elevations, it is important to reduce the windage of the column by facing the convex wall into the prevailing wind.

The chamber 1 also comprises another element 7 that may be a heat exchanger and/or at least a pipe and/or at least a phase separator. It may be a framework 7' in the form of a cuboid containing pipes and acting as a support for the column. Otherwise, the framework may simply contain the pipes and/or a heat exchanger without acting as a support for the column.

The framework 7' may contain the other element 7 with insulation 8 between the element and the framework, or else the structure of the other element 7 may form part of the structure of the chamber.

The planar walls A, B, C are arranged in such a way that the three rectangular planar walls form three of the four edges of a first space 5 in the shape of a cuboid. The three straight walls comprise a first planar wall B, connected to a free edge of the second planar wall A by a right angle and connected to a free edge of the third planar wall C by a right angle. A convex wall D delimits a third space 3 in the form of a truncated cylinder outside of the first space 5. The free edges of the convex wall D are each connected to a free edge of a planar wall A, C. In this way, the first space 5 and the second space 3 are contiguous.

The column 2 is placed at least partially in the second space, but part of the column may lie in the first space.

It will be appreciated that the column may lie wholly in the first space and that another element 2 may lie next to the convex wall, for example a storage facility or a phase separator.

The dimensions of the convex wall D are chosen so that it is just far enough away from the column 2 for the insulation to protect it from absorbing heat.

The convex wall D is an arc of a circle of diameter D' and the cylindrical element has a cross section in the shape of a circle of diameter d, the centres of the circles being at least 1 m apart, the circles D', d preferably being concentric.

The ratio d/D' is preferably between 0.6 and 0.95.

Insulation 8 fills the space between the walls A, B, C, D and the elements 2, 7, and the space between the elements 2, 7.

The minimum separation between the column and the convex wall closest to the column is between 400 mm and 1000 mm.

The minimum separation between the other element and the convex wall closest to the other element is between 400 mm and 1000 mm.

For preference, any element in the chamber is separated from the nearest wall by at least 400 mm, or even 500 mm.

Figure 2:
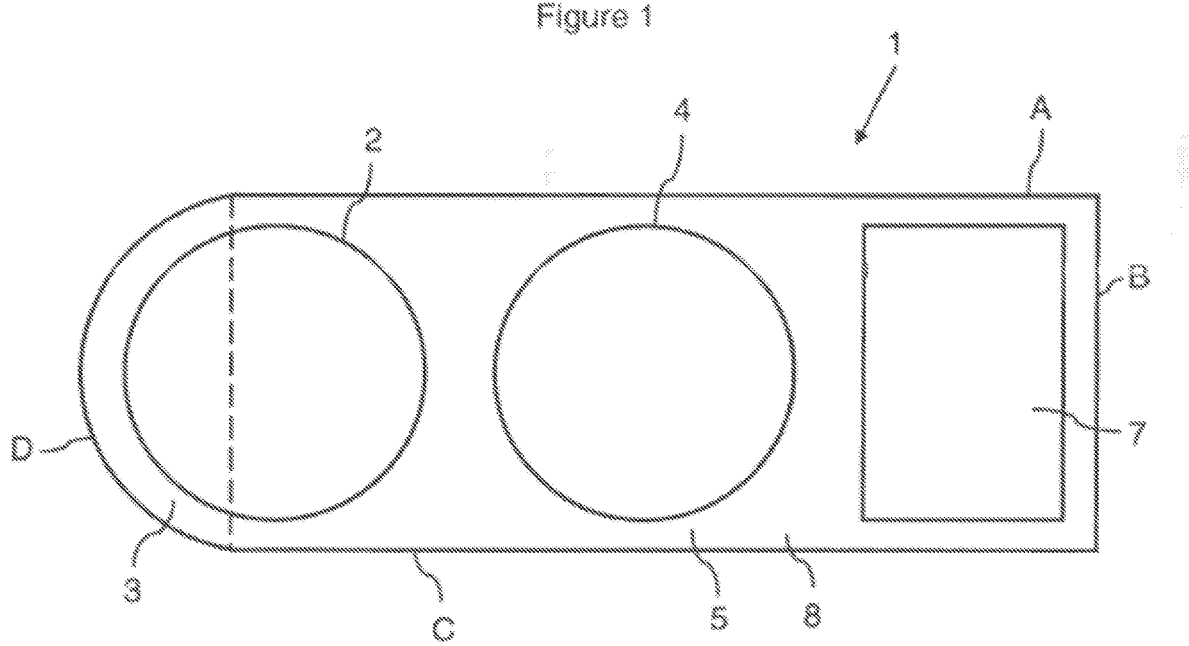
FIG. 2 provides a cross section view of a chamber in accordance with another embodiment of the present invention.

The cylindrical element 2,4 closest to the convex wall has a diameter of at least 1 m, preferably at least 2 m or even at least 4 m FIG. 2 shows an alternative form of FIG. 1, with two cylindrical elements 2, 4, of which one is a distillation column 2, 4 and the other 4, 2 is a storage facility or a distillation column. The elements 2, 4 may or may not have the same diameter. In this instance, the element 2 lies partially in the second space 3, and the element 22 wholly in the first space 5.

In this case, the second space is substantially smaller than the first space 5.

Figure 3:
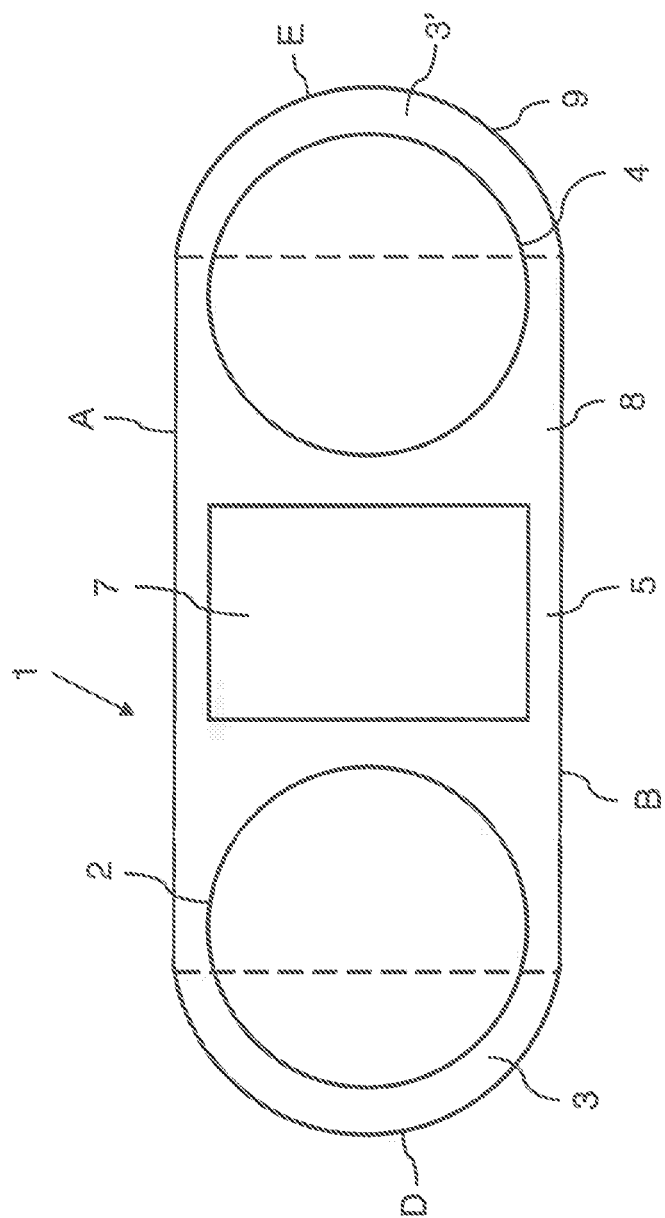
FIG. 3 provides a cross section view of a chamber in accordance with yet another embodiment of the present invention.

FIG. 3 shows an alternative form of FIG. 2 with two parallel planar walls A, B forming the flat edges of a chamber with two convex opposite sides. These two sides are formed by two convex walls D, E.

The planar walls A, B are arranged in such a way that the two rectangular planar walls form two opposite edges of the four edges of a first space 5 in the shape of a cuboid. The two straight walls comprise a first planar wall A connected to a second planar wall by the two convex walls.

A convex wall D delimits a second space 3 in the form of a truncated cylinder outside of the first space 5. The free edges of the convex wall D are each connected to a free edge of a planar wall A, B.

A convex wall E delimits a second space 3' in the form of a truncated cylinder outside of the first space 5. The free edges of the convex wall D are each connected to a free edge of a planar wall A, B.

It will be appreciated that the chamber E may be enlarged if requirements change by replacing the wall B with the wall E so as to slightly increase the footprint.

The chamber contains two cylindrical elements 2, 4, of which one is a distillation column 2, 4 and the other 4, 2 is a storage facility or a distillation column. The elements 2, 4 may or may not have the same diameter. In this instance, the element 2 lies partially in the second space 3, and the element 4 partially in a third space 3' and both 2, 4 are partially in the first space 5. The element 7 is positioned between the elements 2, 4 and wholly in the first space 5.

The element closest to at least one convex wall in all the figures is a cylindrical element 2, 4 such as a column or a storage facility. It is possible in the case of FIG. 3 to replace a cylindrical element 2, 4 with a non-cylindrical element.

For preference, at least one third of the volume of the cylindrical element 2, 4 is situated in the second space 3,3'.

The dimensions of the convex walls D, E are chosen so that they are just far enough away from the column 2, 4 for the insulation to protect them from absorbing heat.

The convex wall D is an arc of a circle of diameter D' and the cylindrical element has a cross section in the shape of a circle of diameter d, the centres of the circles being at least 1 m apart, the circles D', d preferably being concentric.

The ratio d/D' is preferably between 0.6 and 0.95.

The convex wall E is an arc of a circle of diameter D" and the cylindrical element has a cross section in the shape of a circle of diameter d, the centres of the circles being at least 1 m apart, the circles D", d preferably being concentric.

The ratio d/D" is preferably between 0.6 and 0.95.

The minimum separation between the column 2, 4 and the convex wall D, E closest to the column is between 400 mm and 1000 mm.

The minimum separation between the other element 7 and the wall closest to the other element is between 400 mm and 1000 mm.

The cylindrical element 2,4 closest to the convex wall has a diameter of at least 1 m, preferably at least 2 m or even at least 4 m For preference, any element in the chamber is separated from the nearest wall by at least 400 mm, or even 500 mm.

Figure 4:
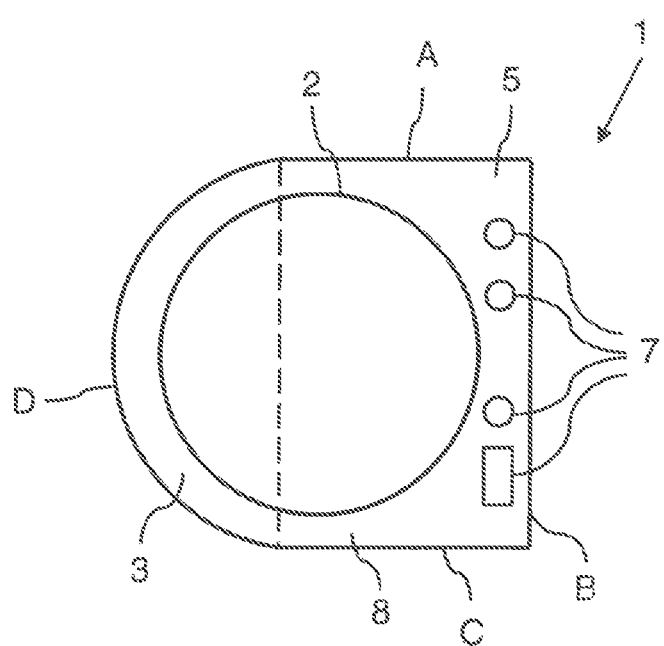
FIG. 4 provides a cross section view of a chamber in accordance with yet another embodiment of the present invention.

In FIG. 4, the chamber 1 is far smaller, more than one quarter, or even half, of the volume of the chamber being occupied by the column 2 positioned near the convex wall D. The part of the chamber near the planar wall B on the opposite side to the convex wall D is occupied by column accessories 7, for example at least one pipe, at least one heat exchanger. These accessories may be mounted in a framework which may be contained inside the chamber 1 or which may form part of the chamber 1, thus making the unit easier to install.

In order to transport part of a chamber for a distillation column, at least one convex wall D, E is transported by a means of transport that may be a lorry or a boat, in which method at least one convex wall is placed on a flat surface of the means of transport, resting on the free edges of the convex wall.

Several convex walls D, E are potentially stacked on top of one another and transported by the means of transport.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A chamber for a distillation column that is to operate at a temperature below 0° C., the chamber comprising:
an inner volume having at least one element and insulation disposed within the inner volume, wherein the at least one element is configured to operate at a temperature below 0° C.;
at least four vertical walls, all having a same height in a vertical direction; and
a roof,
wherein the at least four walls comprise at least two rectangular planar walls and at least one convex wall,
wherein the at least one element that is closest to the convex wall is cylindrical,
wherein the at least four walls is comprised of two convex walls and two rectangular planar walls, wherein the at least four walls are configured to define a first space in the shape of a cuboid, wherein a second space is disposed on each side of the first space, wherein the second space is in the shape of a truncated cylinder,
wherein the chamber further comprises a framework disposed within the inner volume of the chamber, wherein the framework is in the form of a cuboid containing pipes and acts as a support for the at least one element, the framework being contained wholly in the first space of the chamber.

2. The chamber as claimed in claim 1, in which the at least one convex wall has one edge is an arc of a right circular or oval cylinder.

3. The chamber as claimed in claim 1, in which at least one third of the volume of the cylindrical element is disposed in the second space.

4. The chamber as claimed in claim 3, in which just part of the volume of the cylindrical element is disposed in the first space.

5. The chamber as claimed in claim 1, wherein the at least one element is a distillation column that is partially contained in the framework.

6. A chamber for a distillation column that is to operate at a temperature below 0° C., the chamber comprising:
   an inner volume having at least one element and insulation disposed within the inner volume, wherein the at least one element is configured to operate at a temperature below 0° C.;
   at least four vertical walls, all having the same height in the vertical direction; and
   a roof,
   wherein the at least four walls comprise at least two rectangular planar walls and at least one convex wall,
   wherein the at least one element that is closest to the convex wall is cylindrical, wherein the at least four walls are comprised of a convex wall and a first, second, and third rectangular planar walls, wherein the first, second and third rectangular planar walls surround a first space in the form of a cuboid, the first rectangular planar wall connected to a free edge of the second rectangular planar wall by a right angle and also connected to a free edge of the third rectangular planar wall by a right angle, wherein the convex wall is connected to the second and third rectangular planar walls, wherein a second space is defined between the convex wall and the first space,
   wherein the chamber further comprises a framework disposed within the inner volume of the chamber, wherein the framework is in the form of a cuboid containing pipes and acts as a support for the at least one element, the framework being contained wholly in the first space of the chamber.

7. The chamber as claimed in claim 6, in which the at least one convex wall has one edge is an arc of a right circular or oval cylinder and the second space is a half-cylinder.

8. The chamber as claimed in claim 6, in which at least one third of the volume of the cylindrical element is disposed in the second space.

9. The chamber as claimed in claim 8, in which just part of the volume of the cylindrical element is disposed in the first space.

10. The chamber as claimed in claim 6, wherein the at least one element is a distillation column that is partially disposed within the framework.

11. The chamber as claimed in claim 1, wherein the at least one element is selected from the group consisting of two stacked distillation columns, a storage facility, a heat exchanger, pipes, a phase separator, and combinations thereof.

12. The chamber as claimed in claim 1, wherein the at least one element closest to the convex wall is selected from the group consisting of a distillation column, a storage facility, a phase separator, and combinations thereof.

13. The chamber as claimed in claim 1, wherein the convex wall is an arc of a circle of diameter D' and the at least one element has a cross section in the shape of a circle of diameter d, the centers of the two circles being at least 1 m apart.

14. The chamber as claimed in claim 6, wherein the ratio d/D' is between 0.6 and 0.95.

15. The chamber as claimed in claim 1, wherein the insulation is powdered insulation.

16. The chamber as claimed in claim 1, wherein the convex wall is configured to face into the prevailing wind when installed on-site.

* * * * *